(12) United States Patent
Fujihara et al.

(10) Patent No.: US 10,894,453 B2
(45) Date of Patent: Jan. 19, 2021

(54) COUPLING DEVICE, AUTOMATIC TOWING VEHICLE, AND AUTOMATIC TOWING SYSTEM

(71) Applicant: SHARP KABUSHIKI KAISHA, Sakai (JP)

(72) Inventors: Norito Fujihara, Sakai (JP); Nobutoshi Tsujimoto, Sakai (JP); Takurou Miyamoto, Sakai (JP); Hiroki Osawa, Sakai (JP); Hiroto Isome, Sakai (JP); Fumihiro Matsuura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 262 days.

(21) Appl. No.: 16/116,754

(22) Filed: Aug. 29, 2018

(65) Prior Publication Data

US 2019/0061446 A1 Feb. 28, 2019

(30) Foreign Application Priority Data

Aug. 31, 2017 (JP) .................. 2017-167429

(51) Int. Cl.
*B60D 1/04* (2006.01)
*B60D 1/167* (2006.01)
*B60D 1/62* (2006.01)
*B62B 5/00* (2006.01)
*B60D 1/36* (2006.01)
*B60D 1/00* (2006.01)

(52) U.S. Cl.
CPC ............. *B60D 1/04* (2013.01); *B60D 1/1675* (2013.01); *B60D 1/62* (2013.01); *B60D 1/36* (2013.01); *B60D 2001/005* (2013.01); *B62B 5/0079* (2013.01); *B62B 2207/02* (2013.01)

(58) Field of Classification Search
CPC .......... B60D 1/04; B60D 1/62; B60D 1/1675; B60D 2001/005; B60D 1/36; B60D 1/00; B60D 1/246; B60D 2001/001; B62B 5/0079; B62B 2207/02
USPC ........................................ 280/508
See application file for complete search history.

(56) References Cited

U.S. PATENT DOCUMENTS 2,910,307 A * 10/1959 Jennings, Jr. ............ B60D 1/04
280/460.1
5,839,759 A * 11/1998 Trigo ....................... B60D 1/00
280/762

(Continued)

FOREIGN PATENT DOCUMENTS

JP 2017-100575 A 6/2017

*Primary Examiner* — Ruth Ilan
*Assistant Examiner* — Felicia L. Brittman
(74) *Attorney, Agent, or Firm* — ScienBiziP, P.C.

(57) ABSTRACT

A coupling device that couples with a cart includes a coupling portion that couples with the cart, a base portion that guides the coupling portion, and a driving motor that drives the coupling portion. The driving motor drives and controls the coupling portion so as to be changeable among a first state in which the coupling portion is housed, a second state in which the coupling portion is capable of coupling with the cart, and a third state in which the coupling portion couples with the cart. With the coupling portion and a side frame of the cart facing each other, the coupling portion changes from the second state to the third state, thereby causing the coupling portion and the side frame to be coupled to each other.

17 Claims, 15 Drawing Sheets

(56) References Cited

U.S. PATENT DOCUMENTS 9,434,226 B1\* 9/2016 Trigo ...................... B60R 19/48
2018/0281178 A1\* 10/2018 Jacobsen .............. G05D 1/0212

\* cited by examiner

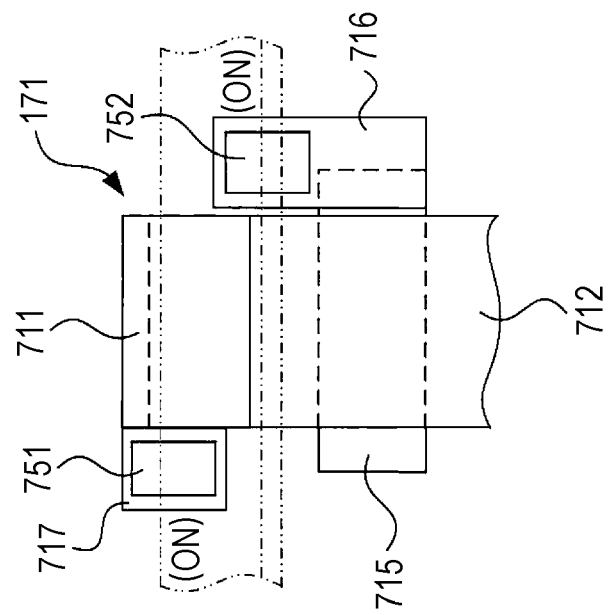
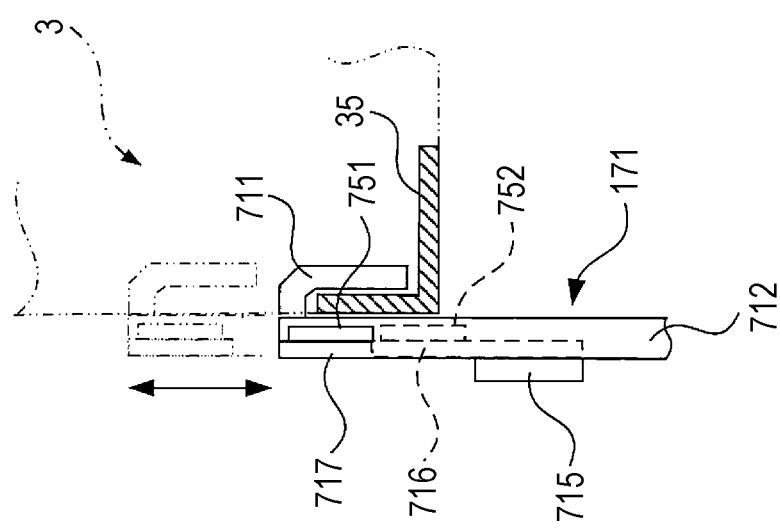
FIG. 21B
FIG. 21A

COUPLING DEVICE, AUTOMATIC TOWING VEHICLE, AND AUTOMATIC TOWING SYSTEM

BACKGROUND

1. Field

The present disclosure relates to a coupling device, an automatic towing vehicle, and an automatic towing system, and, in particular, relates to a coupling device, an automatic towing vehicle, and an automatic towing system for coupling and towing a movable carrier.

2. Description of the Related Art

In general, when delivery work in a factory or work of moving components and the like is performed, for example, a carrier (vehicle to be towed) with casters is used to convey components and the like.

In recent years, there is an automatic conveying system in which a self-movable carrier is automatically conveyed by an automatic conveying apparatus to reduce labor in conveying work in large factories.

As a related art, for example, an unmanned towing vehicle that enters a gap under a vehicle to be towed (conveying cart such as a carrier) to couple with the lower surface of the vehicle to be towed and tows the vehicle to be towed is disclosed (refer to Japanese Unexamined Patent Application Publication No. 2017-100575).

The unmanned towing vehicle according to Japanese Unexamined Patent Application Publication No. 2017-100575 easily couples with and tows the vehicle to be towed by aligning, for the coupling, with the lower surface of the vehicle to be coupled by use of a coupling unit including a roller portion and a coupling portion that are integral with each other.

In the unmanned towing vehicle according to Japanese Unexamined Patent Application Publication No. 2017-100575, however, the shape of the lower surface thereof is needed to match the lower surface of the vehicle to be towed because the shape of the lower surface of the vehicle to be towed is specified depending on the configuration of the coupling unit that couples with the lower surface of the vehicle to be towed.

SUMMARY

The present disclosure is made in consideration of the aforementioned issue of the related art and provides a coupling device, an automatic towing vehicle, and an automatic towing system capable of coupling with and decoupling from a vehicle to be towed with a simple configuration and having excellent versatility that enables usage, with a simple configuration, also for a typical vehicle to be towed.

A coupling device, an automatic towing vehicle, and an automatic towing system according to the present disclosure for addressing the aforementioned issue are described below.

The present disclosure provides a coupling device that couples with a movable vehicle to be towed, the coupling device including: a coupling portion that couples with a portion to be coupled of a front portion of the vehicle to be towed; a base portion to which an end of the coupling portion is connected; and a first driving portion that drives the coupling portion, in which the first driving portion drives the coupling portion so as to be changeable among a first state in which a height of the coupling portion is lower than an undersurface of the vehicle to be towed, a second state in which the height of the coupling portion is higher than the undersurface of the vehicle to be towed, and a third state in which the height of the coupling portion is higher than the undersurface of the vehicle to be towed and lower than the height in the second state, and in which, during coupling between the coupling portion and the vehicle to be towed, with a portion of the coupling portion and the portion to be coupled facing each other, the first driving portion causes the coupling portion to change from the second state to the third state, thereby causing the coupling portion and the portion to be coupled to enter a coupled state of being coupled to each other.

The present disclosure provides an automatic towing vehicle including the coupling device.

The present disclosure provides an automatic towing system including the automatic towing vehicle and a vehicle to be towed by the automatic towing vehicle.

BRIEF DESCRIPTION OF THE DRAWINGS

FIGS. 21A and 21B are illustrations showing a state of detection of a position in the horizontal direction by a second position detecting sensor that detects a position of the coupling portion;

DESCRIPTION OF THE EMBODIMENTS

Hereinafter, embodiments of an automatic towing system of the present disclosure will be described with reference to the drawings.

First Embodiment

Figure 1:
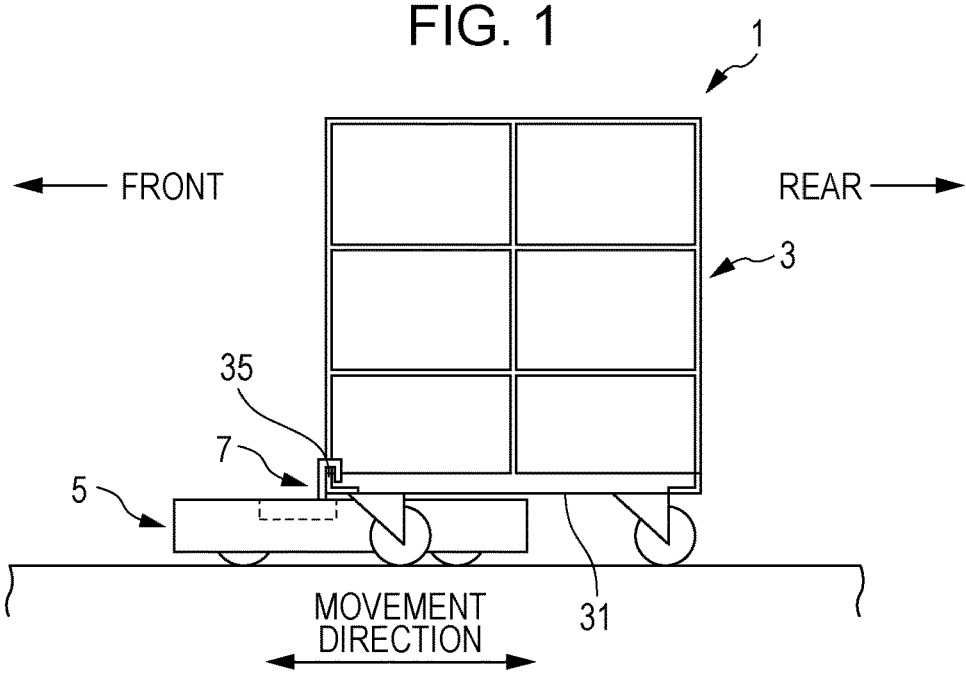
FIG. 1 is an illustration showing a configuration of an automatic towing system according to a first embodiment of the present disclosure.
Figure 2:
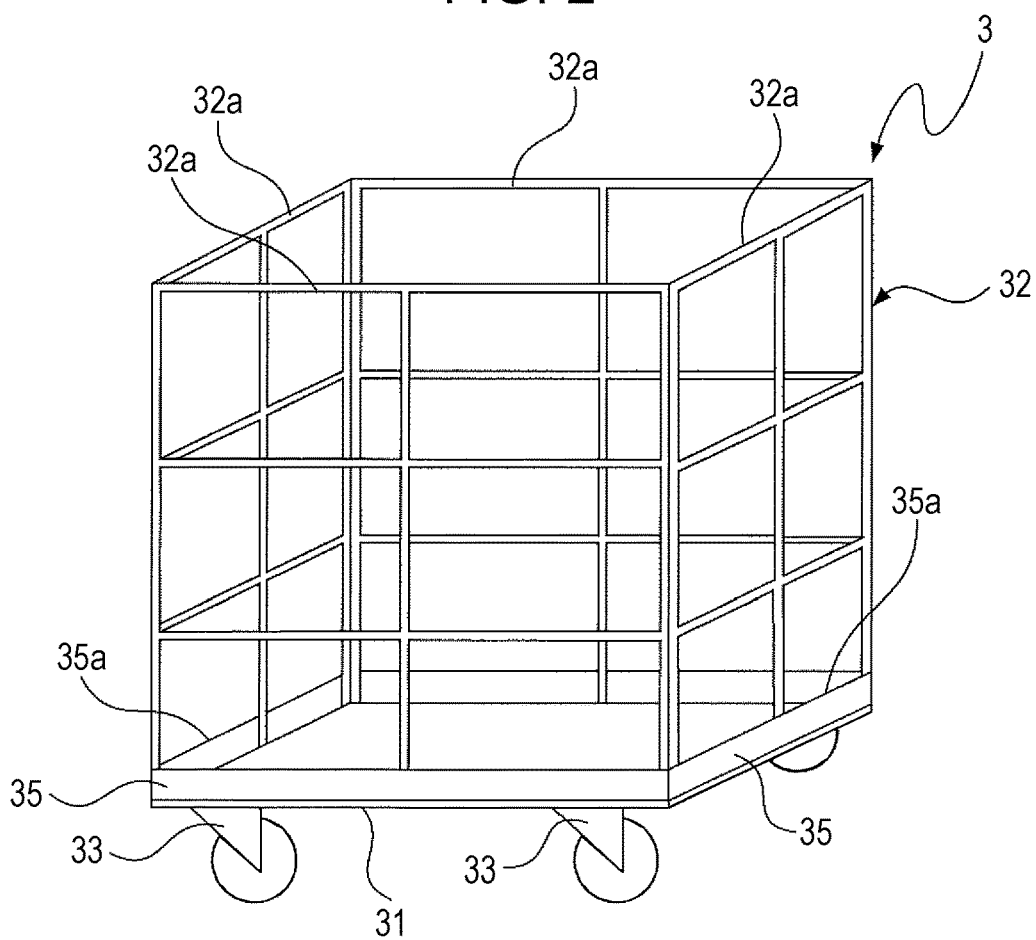
FIG. 2 is a perspective view showing a configuration of a cart constituting the automatic towing system.
Figure 3:
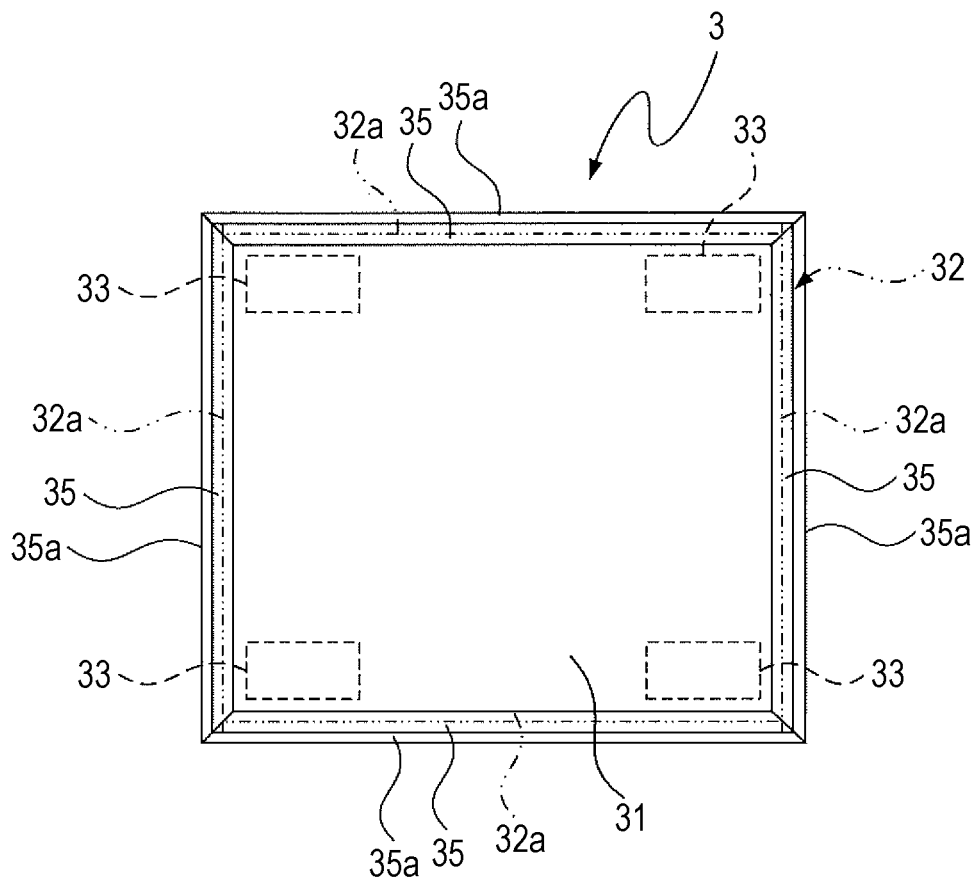
FIG. 3 is a plan view showing a configuration of a bottom portion of the cart.
Figure 4:
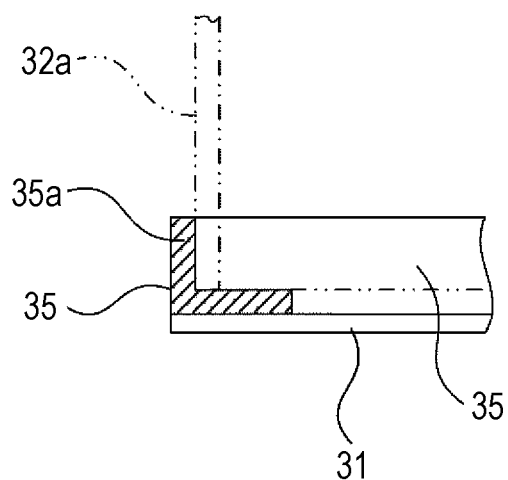
FIG. 4 is a partial detailed view showing a configuration of the bottom portion of the cart.
Figure 5:
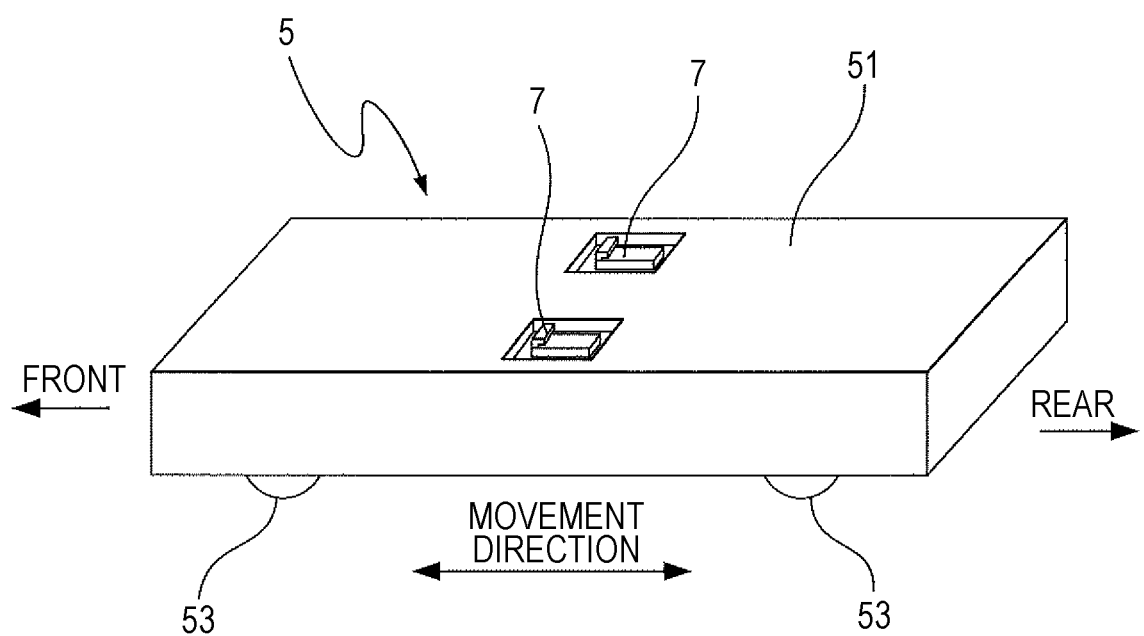
FIG. 5 is an illustration showing a configuration of an automatic towing vehicle constituting the automatic towing system.
Figure 6:
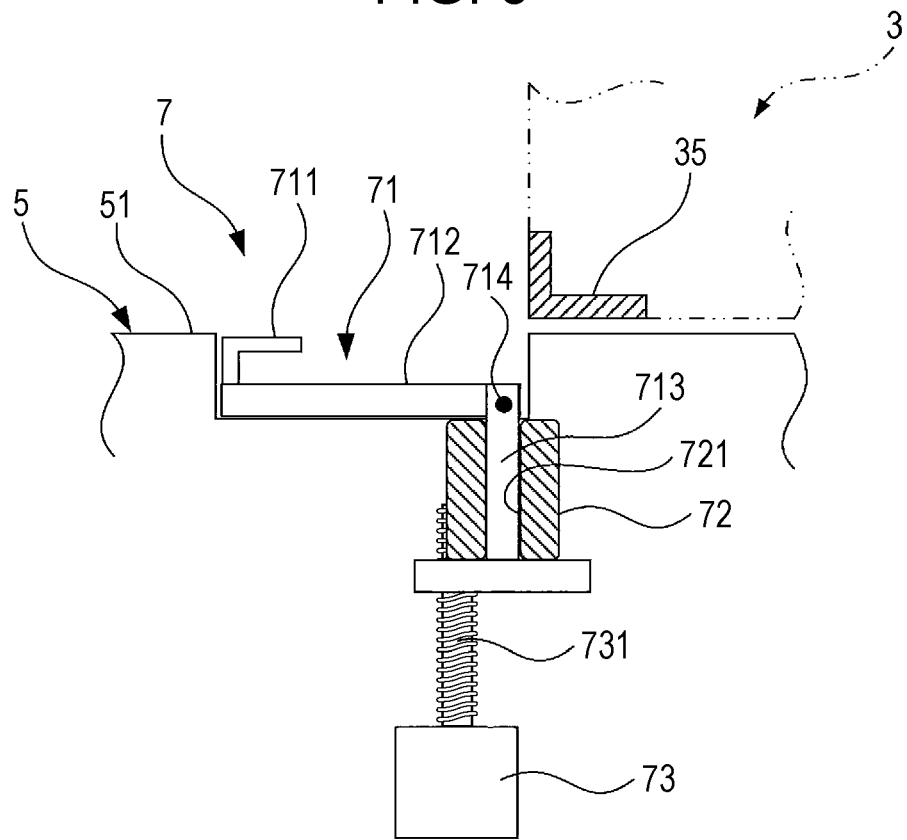
FIG. 6 is an illustration showing a configuration of a coupling device included in the automatic towing vehicle.
Figure 7:
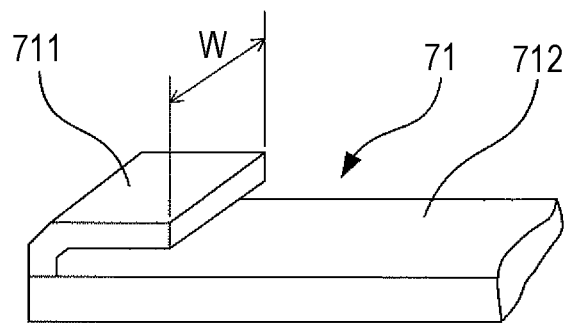
FIG. 7 is an illustration showing a portion of the configuration of a coupling portion constituting the coupling device.
Figure 8:
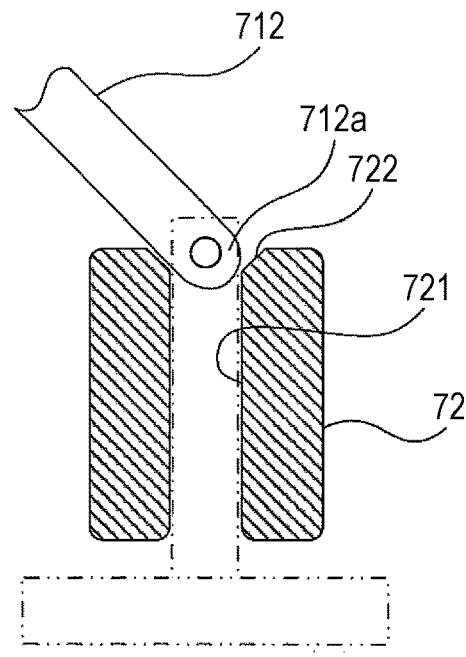
FIG. 8 is an illustration showing a configuration of a base portion constituting the coupling device.

FIG. 1 is an illustration showing a configuration of an automatic towing system, which is an example of a form that embodies the disclosure, according to a first embodiment of the present disclosure. FIG. 2 is a perspective view showing a configuration of a cart that constitutes the automatic towing system. FIG. 3 is a plan view showing a configuration of a bottom portion of the cart. FIG. 4 is a partial detailed view showing a configuration of the bottom portion of the cart. FIG. 5 is an illustration showing a configuration of an automatic towing vehicle that constitutes the automatic towing system. FIG. 6 is an illustration showing a configuration of a coupling device included in the automatic towing vehicle. FIG. 7 is an illustration showing a portion of the configuration of a coupling portion that constitutes the coupling device. FIG. 8 is an illustration showing a configuration of a base portion that constitutes the coupling device.

As shown in FIG. 1, an automatic towing system 1 according to the first embodiment includes an automatic towing vehicle 5 and a cart (vehicle to be towed) 3 that is towed by the automatic towing vehicle 5.

When the automatic towing system 1 performs towing of the cart 3 by using the automatic towing vehicle 5, the towing by the automatic towing vehicle 5 is performed in a state in which a portion of the automatic towing vehicle 5 enters a gap under the cart 3 and in which the cart 3 and the automatic towing vehicle 5 are coupled to each other.

Configuration of Cart 3

The cart 3 is, for example, a roll box pallet that is commonly used in a warehouse.

As shown in FIGS. 2 and 3, the cart 3 includes a substantially rectangular bottom portion 31 and a cage portion 32 that opens upward.

The bottom portion 31 has an undersurface provided with four casters 33 at four corners thereof.

The casters 33 are pivotally supported such that the orientations of wheels thereof are rotatable, and the wheels typically have a diameter of about ϕ 150 mm.

The cart 3 may be provided with, for example, two rotatable casters 33 and two casters (not shown) with fixed wheels.

The outer peripheral edges in four directions of front, rear, left, and right of the bottom portion 31 are constituted by a substantially rectangular frame structure in which a side frame 35 having a substantially L-shaped cross section is disposed. The side frame 35 includes a rising portion 35a that functions as a portion to be coupled by the automatic towing vehicle 5.

The cage portion 32 is constituted by four side surfaces 32a having a substantially grid shape.

As shown in FIG. 4, the lower portions of the four side surfaces 32a of the cage portion 32 are disposed along the side frame 35 extending in the four directions of the bottom portion 31, and, as shown in FIG. 2, the cage portion 32 has a substantially box shape that opens upward. In addition, the cage portion 32 has a structure in which the four side surfaces 32a are foldable.

In the first embodiment, the portion to be coupled is constituted by the side frame 35 disposed in a substantially frame shape on the substantially rectangular bottom portion 31; however, the configuration of the portion to be coupled is not limited thereto. For example, the edge in the four directions of the bottom portion 31 may be folded upward so that a folded portion thereof functions as a portion to be coupled.

Configuration of Automatic Towing Vehicle 5

As shown in FIGS. 1 and 5, the automatic towing vehicle 5 is a self-movable towing vehicle that has a substantially rectangular low-height parallelepiped shape capable of entering the gap under the bottom portion 31 of the cart 3.

The automatic towing vehicle 5 has an upper surface 51 that is provided with coupling devices 7 for coupling with the side frame 35 of the cart 3. The coupling devices 7 enable the cart 3 to be towed by being coupled to the automatic towing vehicle 5. The automatic towing vehicle 5 is provided with wheels 53 on a lower portion thereof so as to be self-movable.

Configuration of Coupling Device 7

As shown in FIG. 5, two coupling devices 7 are disposed, one at each of two positions, so as to be parallel to each other in the width direction of the automatic towing vehicle 5. In the first embodiment, the coupling devices 7 are disposed at positions displaced toward the front from the longitudinal-direction center portion of the automatic towing vehicle 5. The automatic towing vehicle 5 is weighted at the rear portion thereof so as to be capable of stably traveling when towing the cart 3.

As shown in FIG. 6, each of the coupling devices 7 includes a coupling portion 71 that couples with the side frame 35 at a front portion of the cart 3, a base portion 72 that is connected to an end of the coupling portion 71 and guides the operation of the coupling portion 71, and a driving motor (first driving portion) 73 that drives the coupling portion 71.

The coupling portion 71 may include a hook portion 711 that couples with the side frame 35, an arm portion 712 that has a front end portion on which the hook portion 711 is disposed, and an arm driving portion 713 that has an end portion coupled to the arm portion 712 and the other end portion to which the driving motor 73 is connected.

As shown in FIG. 7, the coupling portion 71 has a predetermined width W so that a coupled state of coupling with the side frame 35 is stable. The width W of the coupling portion 71 is determined in accordance with the weight of the cart 3 to be towed, the shape of the portion to be coupled, and the like.

As shown in FIG. 6, the other end portion of the arm portion 712 is swingably attached to the arm driving portion 713 by a support shaft member 714.

The arm driving portion 713 includes a portion that is slidably connected to the base portion 72 and an end portion that is connected to the driving motor 73.

The base portion 72 may function as a guiding portion (introducing portion) that guides the vertical operation of the arm driving portion 713 and also guides the operation of introducing a portion of the arm portion 712.

Specifically, a guiding portion 721 that is disposed, by using an inside sidewall of the base portion 72, in an inner portion of the base portion 72 guides and holds the operation of the arm portion 712 in a state in which the horizontal movement of the arm portion 712 is restricted.

As shown in FIG. 8, the guiding portion 721 may be chamfered such that an open portion 722 widely opens for ease of introducing an end portion 712a of the arm portion 712 that is to be introduced. In addition, to avoid interference of the end portion 712a of the arm portion 712 with respect to the open portion 722, the end portion 712a may have a substantially arc shape.

As shown in FIG. 6, the driving motor 73 includes a screw 731 and uses the screw 731 to cause the arm driving portion 713 of the coupling portion 71 to operate in the vertical direction, thereby causing the coupling portion 71 to perform coupling/releasing (decoupling) with respect to the cart 3.

Next, operational states of the coupling portion 71 caused by the driving motor 73 in each coupling device 7 will be described with reference to the drawings.

Figure 9:
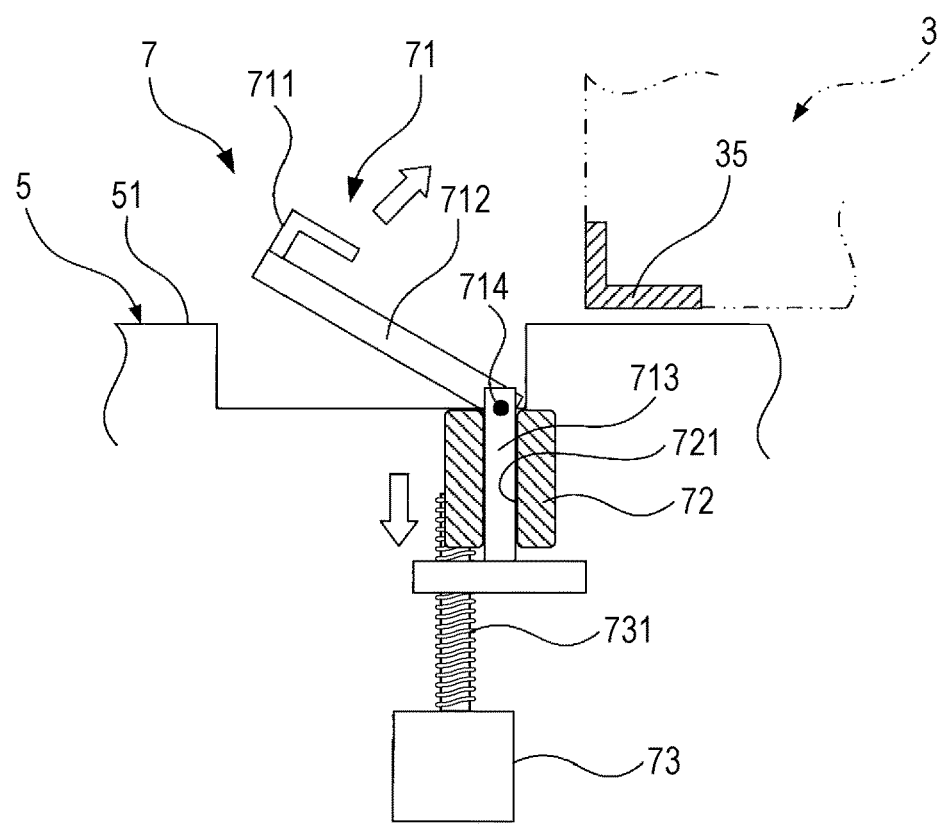
FIG. 9 is an illustration showing an operational state of the coupling device changing from a first state to a second state.
Figure 10:
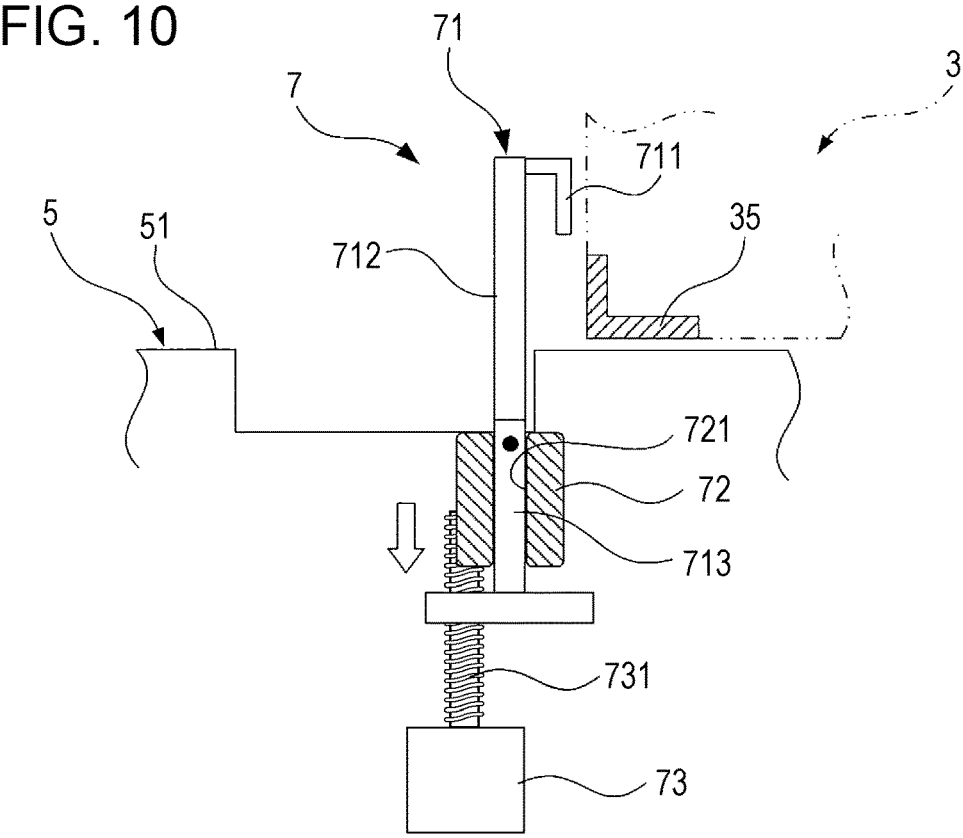
FIG. 10 is an illustration showing the second state of the coupling device.
Figure 11:
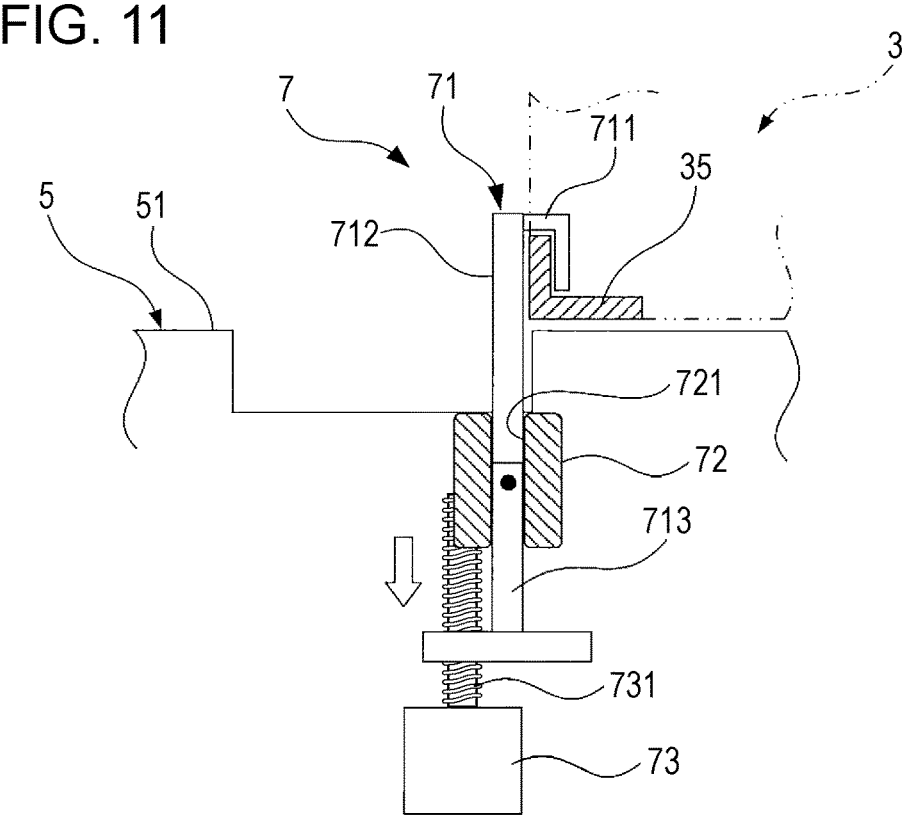
FIG. 11 is an illustration showing a third state of the coupling device.

FIG. 9 is an illustration showing an operational state of the coupling device that constitutes the automatic towing vehicle according to the first embodiment changing from a first state to a second state. FIG. 10 is an illustration showing the second state of the coupling device. FIG. 11 is an illustration showing a third state of the coupling device.

The coupling portion 71 performs coupling operation to couple with the cart 3 by changing the state thereof among, roughly, three states.

First, the first state is a state in which the height of the coupling portion 71 is lower than the undersurface of the cart 3, as shown in FIG. 6, with the automatic towing vehicle 5 entering under the cart 3, that is, a state in which the arm portion 712 of the coupling portion 71 is folded down together with the hook portion 711 so as not to protrude from the upper surface 51 of the automatic towing vehicle 5 and housed inside the automatic towing vehicle 5.

Next, when the screw 731 is rotated due to driving of the driving motor 73, the arm driving portion 713 moves downward and a portion of the arm portion 712 is thereby introduced into the guiding portion 721 of the base portion 72, which causes the coupling portion 71 to enter a standing-up state, as shown in FIG. 9.

Consequently, as shown in FIG. 10, the height of the coupling portion 71 becomes higher than the undersurface of the cart 3, that is, the arm portion 712 of the coupling portion 71 stands upright together with the hook portion 711 and the hook portion 711 is disposed above the side frame 35. This state is the second state.

When the automatic towing vehicle 5 moves rearward and reaches a predetermined position at which the coupling portion 71 couples with the cart 3, the automatic towing vehicle 5 is capable of coupling with the side frame 35 from above the side frame 35.

Then, as shown in FIG. 11, when the driving motor 73 is additionally driven to move the arm portion 712 downward, the height of the coupling portion 71 becomes higher than the undersurface of the cart 3 and lower than the height in the second state, in other words, when the coupling portion 71 moves to the predetermined position for coupling with the cart 3, the hook portion 711 of the coupling portion 71 is in a state of coupling with the side frame 35. This state is the third state.

Thus, the driving motor 73 drives and controls the coupling portion 71 so as to be changeable among the first state, the second state, and the third state described above.

In the first embodiment, when the second state changes to the third state, the coupling portion 71 may be held by the guiding portion 721 in a state in which a portion of the arm portion 712 is introduced into the guiding portion 721 of the base portion 72, as shown in FIG. 11 and in which the horizontal movement of the arm portion 712 is restricted. Consequently, the coupled state of the coupling portion 71 coupling with to the side frame 35 is stably maintained.

Next, coupling operation of the automatic towing vehicle 5 with respect to the cart 3 in the automatic towing system 1 according to the first embodiment will be described in accordance with a flow chart with reference to the drawings.

Figure 12:
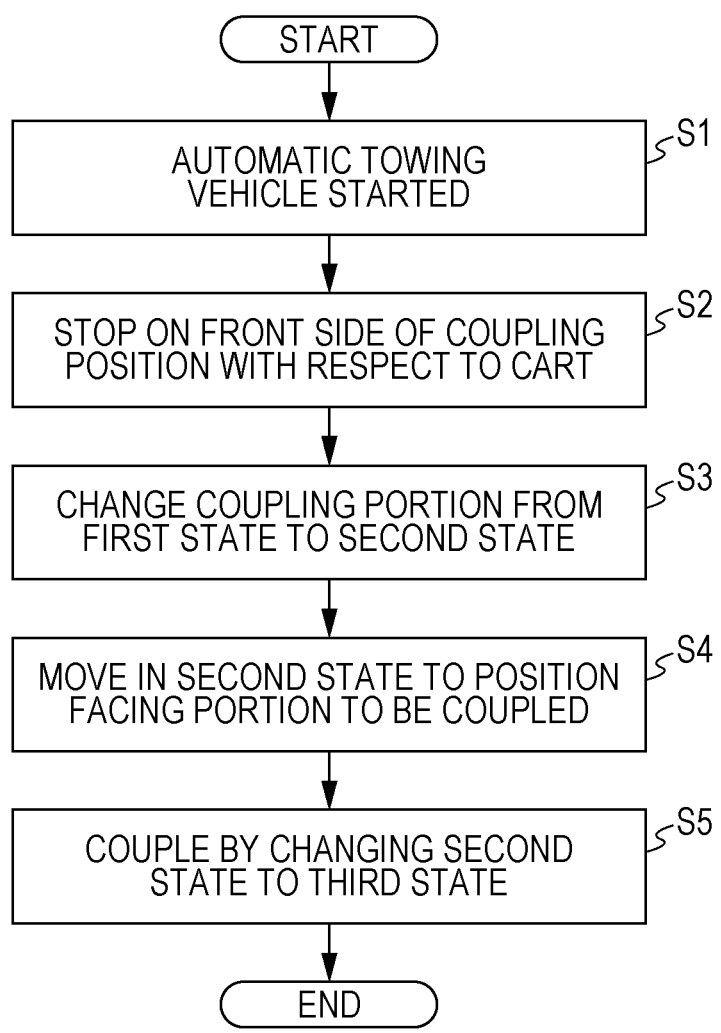
FIG. 12 is a flow chart showing an outline of steps of coupling operation of the automatic towing vehicle with respect to the cart in the automatic towing system.
Figure 13:
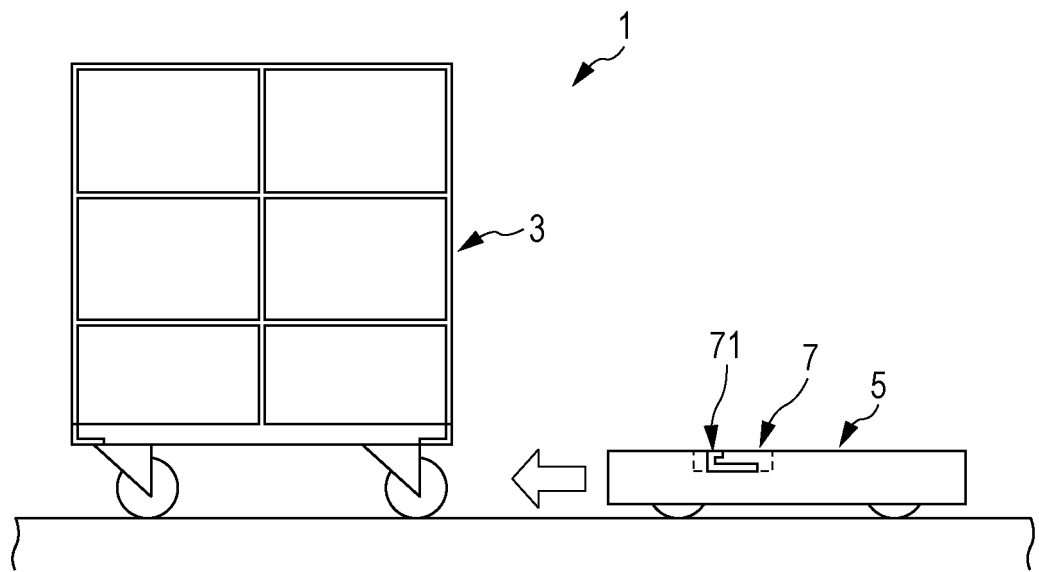
FIG. 13 is an illustration showing a state in which the automatic towing vehicle approaches the cart in the automatic towing system.
Figure 14:
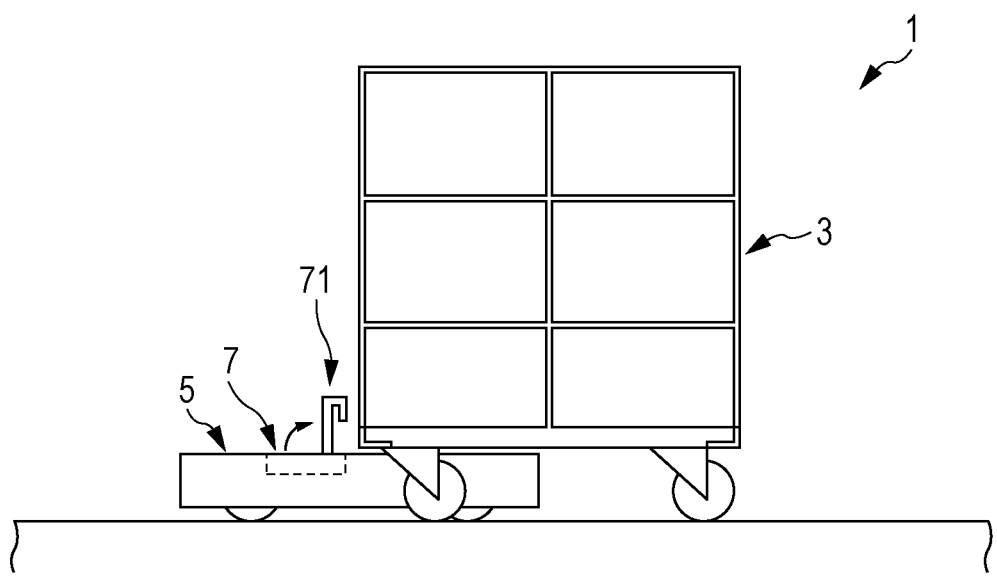
FIG. 14 is an illustration showing a state (second state) in which coupling between the automatic towing vehicle and the cart is started in the automatic towing system.
Figure 15:
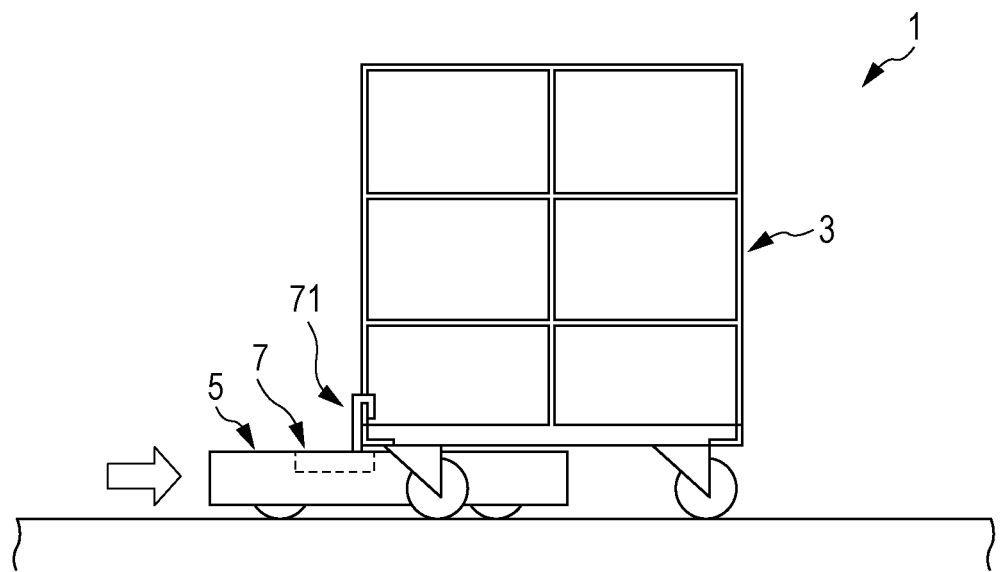
FIG. 15 is an illustration showing a state in which the automatic towing vehicle moves to a processing position with respect to the cart in the automatic towing system.
Figure 16:
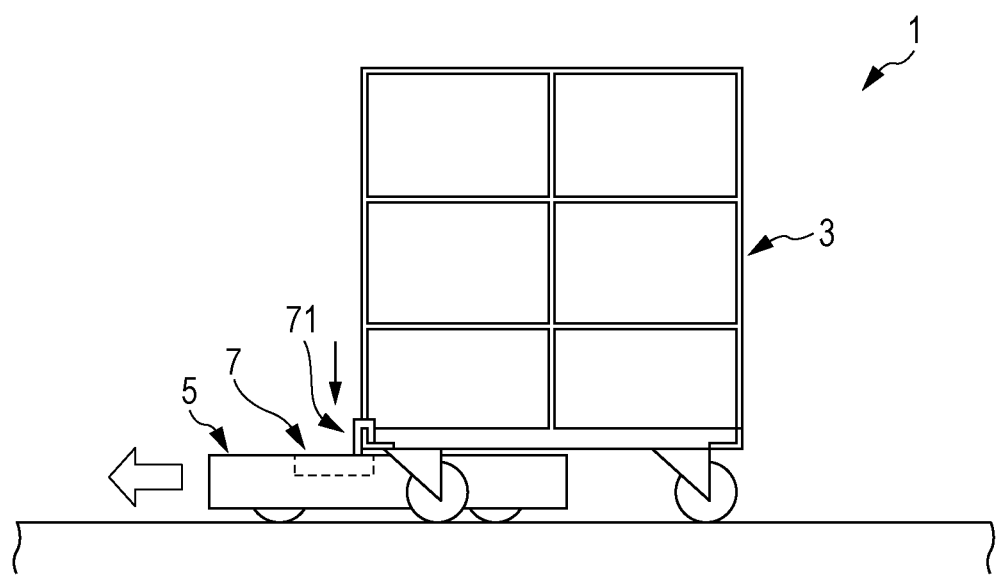
FIG. 16 is an illustration showing a state in which the automatic towing vehicle and the cart are coupled to each other to start towing operation in the automatic towing system.
Figure 17:
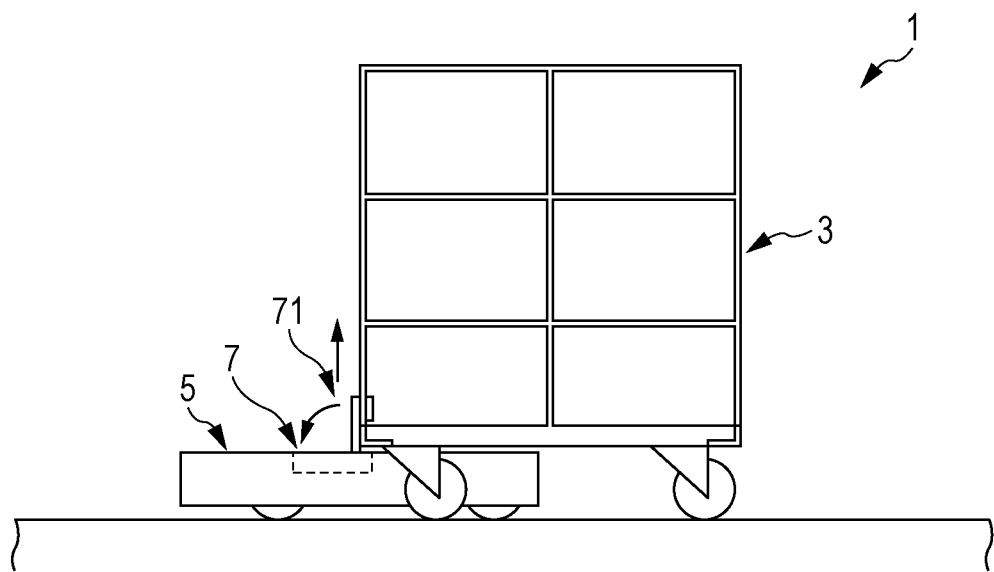
FIG. 17 is an illustration showing operation of releasing the coupled state after the automatic towing vehicle and the cart move to a predetermined position in the automatic towing system.
Figure 18:
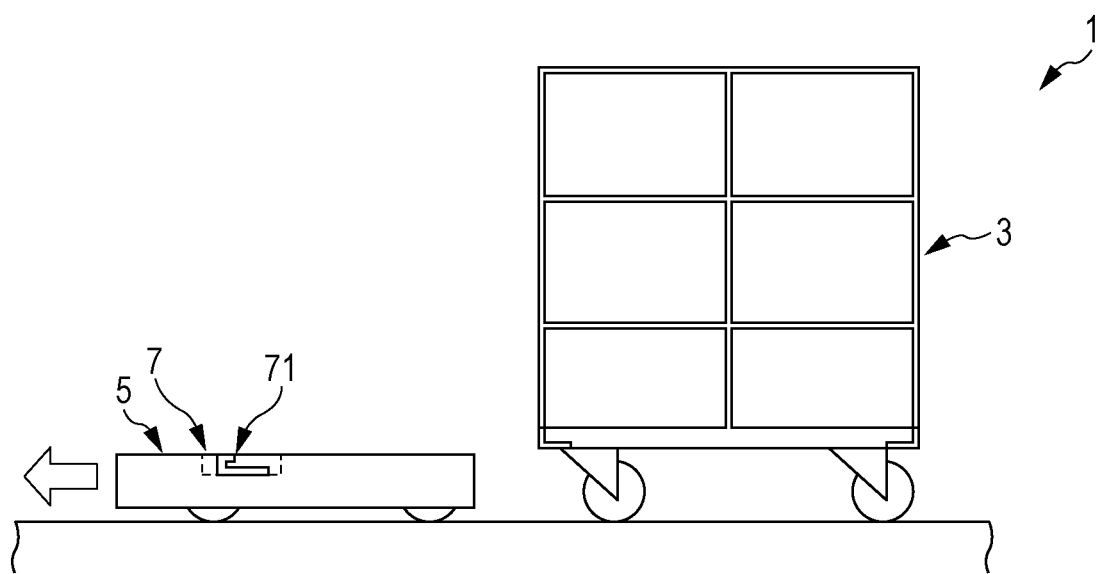
FIG. 18 is an illustration showing a state in which the automatic towing vehicle moves from the cart in the automatic towing system.

FIG. 12 is a flow chart showing an outline of steps of coupling operation of the automatic towing vehicle with respect to the cart in the automatic towing system according to the first embodiment. FIG. 13 is an illustration showing a state in which the automatic towing vehicle approaches the cart in the automatic towing system. FIG. 14 is an illustration showing a state (second state) in which coupling between the automatic towing vehicle and the cart is started in the automatic towing system. FIG. 15 is an illustration showing a state in which the automatic towing vehicles moves to a processing position with respect to the cart in the automatic towing system. FIG. 16 is an illustration showing a state in which the automatic towing vehicle and the cart are coupled to each other to start towing operation in the automatic towing system. FIG. 17 is an illustration showing operation of releasing the coupled state after the automatic towing vehicle and the cart move to a predetermined position in the automatic towing system. FIG. 18 is an illustration showing a state in which the automatic towing vehicle moves from the cart in the automatic towing system.

In the automatic towing system 1 according to the first embodiment, the automatic towing vehicle 5 is automatically operated to perform, at a predetermined position, coupling processing with respect to the cart 3 specified and is then automatically operated to move the cart 3 to a predetermined position.

To tow the cart 3 by coupling the cart 3 to the automatic towing vehicle 5 in the automatic towing system 1, first, as shown in FIG. 12, automatic operation of the automatic towing vehicle 5 is started (step S1).

Next, the automatic towing vehicle 5 moves to a predetermined position with respect to the cart 3 and stops (step S2). In the step S2, as shown in FIG. 13, the automatic towing vehicle 5 passes under the cart 3 from the rear side of the cart 3 and, as shown in FIG. 14, stops with respect to the cart 3 when the coupling portion 71 is positioned on the front side of a coupling position. In other words, the automatic towing vehicle 5 couples with the cart 3 from the front side of the cart 3.

In the first embodiment, for example, the cart 3 is disposed at a preset position and the automatic towing vehicle 5 stops at a preset position on the front side of the cart 3.

Next, as shown in FIG. 14, the automatic towing vehicle 5 changes (step S3) the coupling portion 71 of each coupling device 7 from the first state to the second state and, as shown in FIG. 15, moves (step S4) with the coupling portion 71 being in the second state to a position for coupling with the cart 3.

In the first embodiment, the automatic towing vehicle 5 moves from a preset position on the front side of the cart 3 by a preset distance, thereby causing the coupling portion 71 to be placed at a position for coupling with the cart 3.

Next, as shown in FIG. 16, the coupling portion 71 is changed from the second state to the third state, thereby coupling (step S5) the coupling portion 71 to the side frame 35 of the cart 3.

In the first embodiment, the coupling portion 71 is lowered by the driving motor 73 by a preset distance, thereby coupling the coupling portion 71 to the side frame 35.

Consequently, coupling processing of the automatic towing vehicle 5 with respect to the cart 3 is completed. Then, the automatic towing vehicle 5 tows the cart 3.

As shown in FIG. 17, to release the coupled state of coupling with the cart 3, the coupling by the coupling portion 71 is released through a reverse operation. Next, as shown in FIG. 18, the coupling portion 71 is housed in the automatic towing vehicle 5 and the automatic towing vehicle 5 is moved out from under the cart 3.

Consequently, the towing of the cart 3 by the automatic towing vehicle 5 is completed.

As a result of the aforementioned configuration, according to the first embodiment, there are included, as the coupling device 7 that couples with the movable cart 3, the coupling portion 71 that couples with the side frame 35 of the front portion of the cart 3, the base portion 72 that is connected to an end of the coupling portion 71 and guides the operation of the coupling portion 71, and the driving motor 73 that drives the coupling portion 71, the driving motor 73 driving the coupling portion 71 so as to be changeable among the first state (state in which the coupling portion 71 is housed), the second state (state in which the coupling portion 71 stands upright), and the third state (state in which the coupling portion 71 and the cart 3 are coupled to each other), which enables operation of coupling/decoupling with respect to the cart 3 to be performed with a simple configuration.

In addition, according to the first embodiment, an automatic towing vehicle mounted with, as coupling devices that couple with the cart 3, the coupling devices 7 that have the aforementioned configuration is used as the automatic towing vehicle 5 that tows the movable cart 3, which provides an automatic towing vehicle that is capable of coupling/decoupling, with a simple configuration, with and from the cart 3 and that has excellent versatility that enables usage, with a simple configuration, also for a typical cart.

In addition, according to the first embodiment, the automatic towing vehicle 5 that has the aforementioned configuration is used in the automatic towing system 1 in which the movable cart 3 is towed by an automatic towing vehicle, which provides an automatic towing system that is capable of coupling/decoupling, with a simple configuration, with and from the cart 3 and that has excellent versatility that enables usage, with a simple configuration, also for a typical cart.

In addition, in the first embodiment, there are included, as components of the coupling device 7, the coupling portion 71 that includes the arm portion 712 capable of being folded down and the base portion 72 that guides the operation of the coupling portion 71, the coupling portion 71 being vertically moved by the driving motor 73 to thereby fold down with the operation of the arm portion 712 being guided by the base portion 72 and vertically move the arm portion 712, which enables the coupling portion 71 to be stably held with the horizontal movement of the coupling portion 71 being restricted by the base portion 72 and enables coupling operation to be performed stably in a small space.

In addition, in the first embodiment, the coupling devices 7 are disposed at the two positions on an upper portion of the automatic towing vehicle 5 so as to be parallel to each other, which enables reliable coupling with the cart 3 and stable traveling while towing.

In addition, in the first embodiment, the side frame 35 that constitutes the bottom portion 31 of the cart 3 is used as a portion to be coupled in the cart 3, which enables the coupling devices 7 to couple, with a simple configuration and without an additionally formed portion to be coupled, with the cart 3. Thus, the coupling devices 7 are capable of coupling, with simple change or modification of the configuration, also with a typical general-purpose cart.

Second Embodiment

Next, a second embodiment will be described with reference to the drawings.

Figure 19:
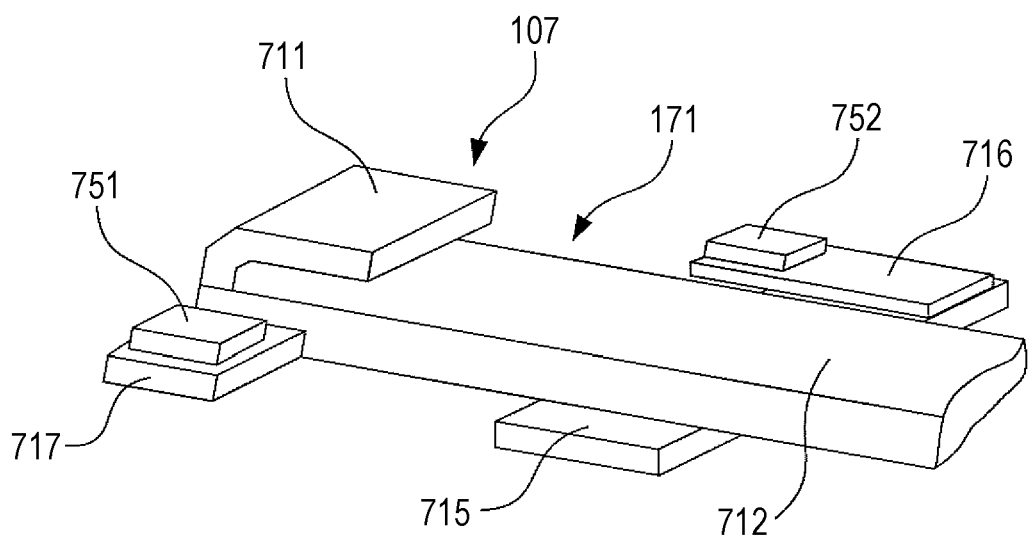
FIG. 19 is an illustration showing a configuration of a coupling portion constituting a coupling device according to a second embodiment.
Figure 20B:
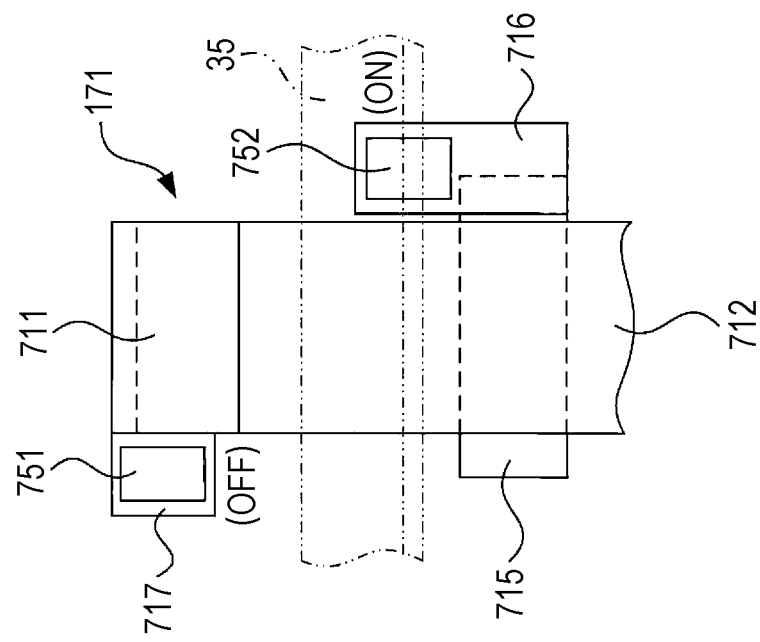
FIGS. 20A and 20B are illustrations showing a state of detection of a position in the vertical direction by a first position detecting sensor that detects a position of the coupling portion.
Figure 20A:
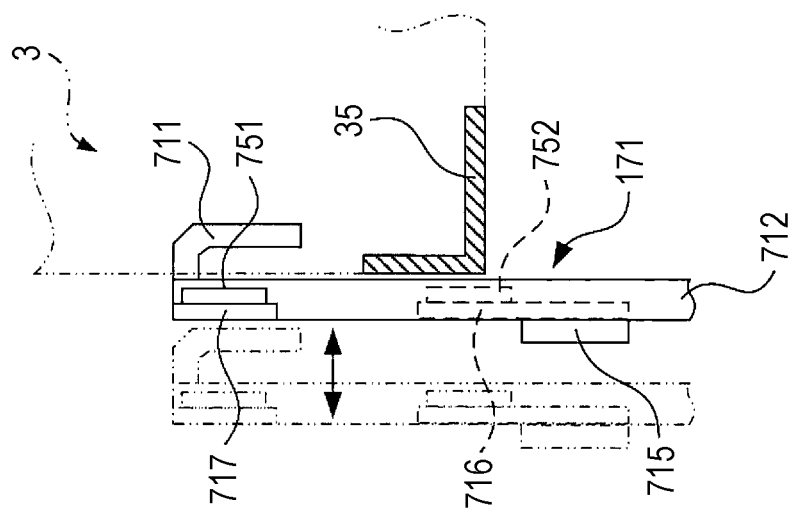

FIG. 19 is an illustration showing a configuration of a coupling portion that constitutes a coupling device according to the second embodiment. FIGS. 20A and 20B are a side view and a front view, respectively, showing a state of detection of a position in the vertical direction by a first position detecting sensor that detects a position of the coupling portion. FIGS. 21A and 20B are a side view and a front view, respectively, showing a state of detection of a position in the horizontal direction by a second position detecting sensor that detects a position of the coupling portion.

Note that, regarding components of the coupling device in the second embodiment, components that are identical to the components of the coupling device according to the first embodiment are given the same reference signs, and description thereof will be omitted.

As shown in FIG. 19, a coupling device 107 according to the second embodiment may include, on side portions of the arm portion 712 of a coupling portion 171, a first position detecting sensor 751 that detects a position in the vertical direction with respect to a portion to be coupled of the coupling portion 171 and a second position detecting sensor 752 that detects a position in the horizontal direction (front-rear direction) with respect to the portion to be coupled of the coupling portion 171.

In addition, the second embodiment may include a second driving portion capable of adjusting a position in the horizontal direction (front-rear direction) with respect to the portion to be coupled of the coupling portion 171. In the second embodiment, a driving portion (not shown) that causes the automatic towing vehicle 5 to travel is controlled to function as the second driving portion.

As shown in FIG. 19 and FIGS. 20A and 20B, the second position detecting sensor 752 is disposed, via an attachment plate 716, on a guiding member 715 that moves in conjunction with operation of the coupling portion 171 changing from the first state (folded state) to the second state (upright state) so as to be disposed adjacent to the side portion of the arm portion 712 below the hook portion 711 such that the guiding member 715 in the second state is positioned facing the side frame 35.

The guiding member 715 moves in conjunction with the operation of the coupling portion 171 changing from the first state to the second state but maintains the upright state without operating in the vertical direction when the coupling portion 171 changes from the second state to the third state (coupled state).

The second position detecting sensor 752 detects a position of the side frame 35 when, as shown in FIGS. 20A and 20B, in a state in which the coupling portion 171 changes from the first state to the second state in which the hook portion 711 is disposed above the side frame 35, the coupling portion 171 is moved toward the side frame 35, and the second position detecting sensor 752 thereby detects a position in the horizontal direction (front-rear direction) of a coupling position at which the arm portion 712 and the side frame 35 are coupled to each other.

The first position detecting sensor 751 is a proximity sensor and, as shown in FIG. 19 and FIGS. 21A and 21B, disposed on the side portion of the arm portion 712 so as to be positioned adjacent to the hook portion 711 via an attachment plate 717.

The first position detecting sensor 751 detects a position of the side frame 35 when, in the second state in which the hook portion 711 is disposed above the side frame 35 with the arm portion 712 being close to the side frame 35, the coupling portion 171 changes from the second state to the third state, as shown in FIGS. 21A and 21B, and the first position detecting sensor 751 thereby detects a position in the vertical direction of the coupling position at which the hook portion 711 and the side frame 35 are coupled to each other.

The driving motor (first driving portion) 73 of the coupling device 107 drives and controls, on the basis of a detection result of the first position detecting sensor 751, the coupling portion 171 so as to change from the second state to the third state.

The driving portion (second driving portion) of the automatic towing vehicle 5 drives and controls, on the basis of a detection result of the second position detecting sensor 752, the coupling portion 171 to adjust the position thereof in the horizontal direction (front-rear direction) with respect to the side frame 35 (cart 3) so that the coupling portion 171 enters a state of being capable of coupling when the arm portion 712 and the side frame 35 face each other and the hook portion 711 is lowered in the second state of the coupling portion 171.

The first position detecting sensor 751 is switched on when the hook portion 711 is in a state of coupling with the side frame 35. The second position detecting sensor 752 is switched on when the arm portion 712 is in a state of being close to the side frame 35. Thus, in the second embodiment, the state in which the coupling device 107 couples with the cart 3 is determined when both the first position detecting sensor 751 and the second position detecting sensor 752 are switched on.

In addition, in the second embodiment, similarly to the first embodiment, two coupling devices 107 are disposed, one at each of two positions, so as to be parallel to each other; thus, the first position detecting sensor 751 and the second position detecting sensor 752 are disposed on the coupling portion 171 of each of the coupling devices 107, and during operation control, the coupled state is determined when all of the four sensors are switched on. Consequently, it is possible to ensure the coupled state of the coupling devices 107 and the cart 3.

As a result of the aforementioned configuration, according to the second embodiment, there is included the first position detecting sensor 751 on the side portion of the arm portion 712 of the coupling portion 171 to enable the position in the vertical direction with respect to the side frame 35, which is the portion to be coupled of the coupling portion 171, to be detected, and there is included the second position detecting sensor 752 on the side portion of the arm portion 712 of the coupling portion 171 to enable the position in the horizontal direction (front-rear direction) with respect to the side frame 35 to be detected, which enables coupling of the coupling portion 171 with respect to the side frame 35 to be performed at a precise position.

In the second embodiment, the second position detecting sensor 752 is disposed on the guiding member 715 so as to operate separately from the arm portion 712; however, the second position detecting sensor 752 may be disposed directly on the side portion of the arm portion 712 so as to be integral therewith, and the attachment methods of the first position detecting sensor 751 and the second position detecting sensor 752 are not limited thereto.

Third Embodiment

Next, a third embodiment will be described with reference to the drawings.

Figure 22:
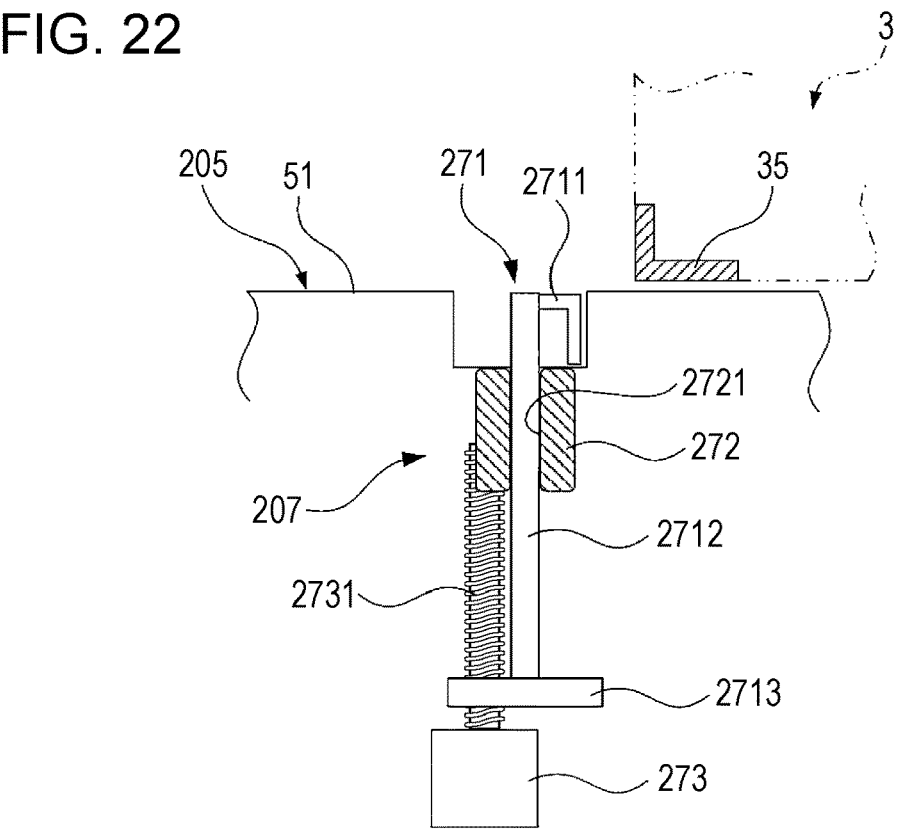
FIG. 22 is an illustration showing a configuration of a coupling device according to a third embodiment.
Figure 23:
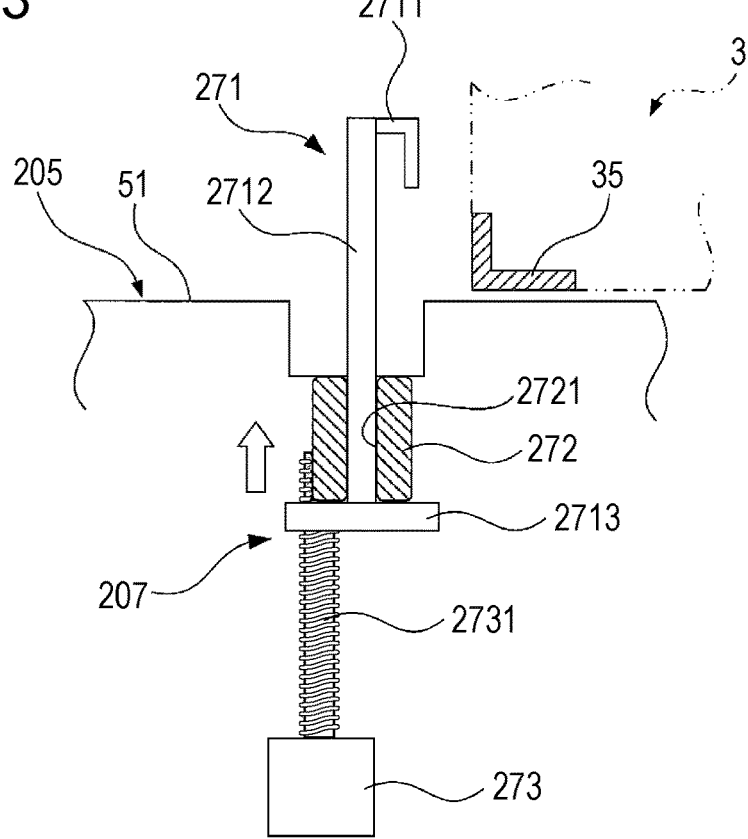
FIG. 23 is an illustration showing a second state of the coupling device.
Figure 24:
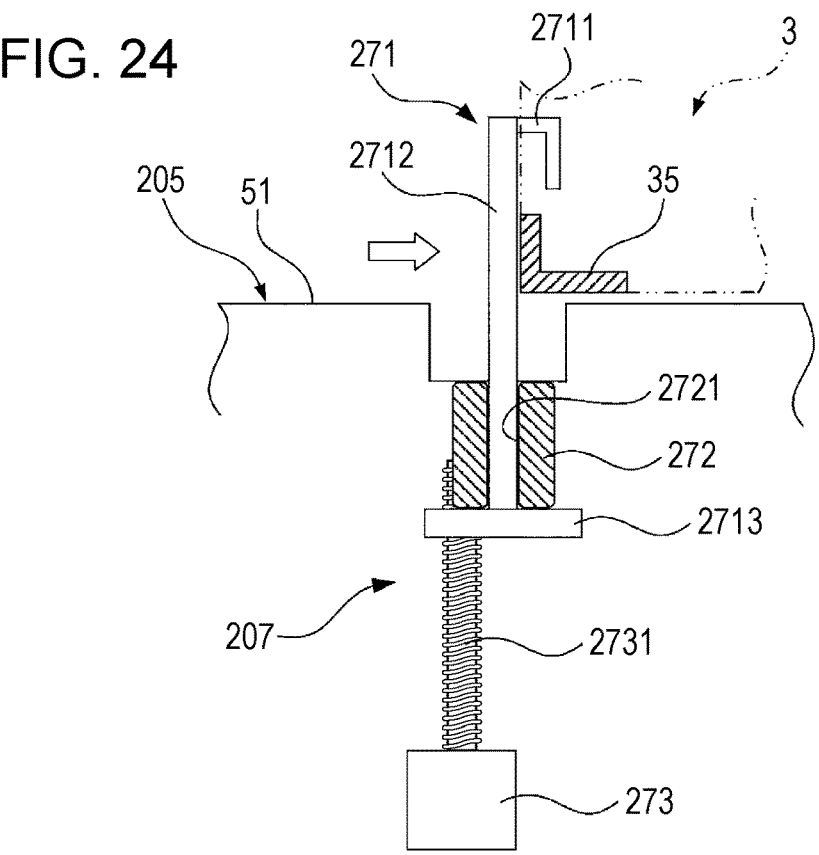
FIG. 24 is an illustration showing a state in which the coupling device in the second state approaches the cart.
Figure 25:
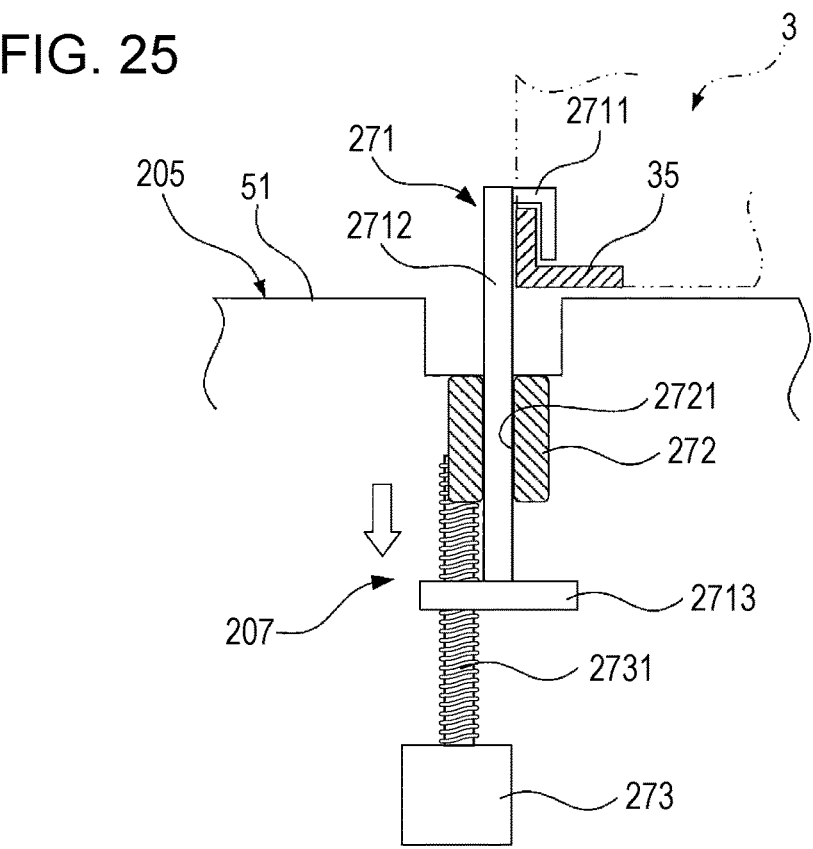
FIG. 25 is an illustration showing a third state of the coupling device.

FIG. 22 is an illustration showing a configuration of a coupling device according to the third embodiment. FIG. 23 is an illustration showing the second state of the coupling device. FIG. 24 is an illustration showing a state in which the coupling device in the second state approaches the cart. FIG. 25 is an illustration showing the third state of the coupling device.

Note that, regarding components of the coupling device in the third embodiment, components that are identical to the components of the coupling device according to the first embodiment are given the same reference signs, and description thereof will be omitted.

As shown in FIG. 22, a coupling device 207 according to the third embodiment includes a coupling portion 271 that couples with the side frame 35 of the front portion of the cart 3; a base portion 272 that is connected to an end of the coupling portion 271 and guides the operation of the coupling portion 271; and a driving motor (first driving portion) 273 that drives the coupling portion 271.

As an alternative to the coupling portion 71 of the first embodiment in which the arm portion 712 performs folding-down operation and vertical operation, the third embodiment includes the coupling portion 271 characterized by performing coupling operation through only the vertical operation in an upright state.

The coupling portion 271 includes a hook portion 2711 that couples with the side frame 35; and an arm portion 2712 that has a front end portion on which the hook portion 2711 is disposed.

Similarly to the first embodiment, the coupling portion 271 has a predetermined width so that a coupled state of coupling with the side frame 35 is stable.

The arm portion 2712 has the other end portion on which an arm driving portion 2713 to be connected to the driving motor 273 is integrally formed.

The base portion 272 functions as a guiding portion (introducing portion) that guides the vertical operation of the arm portion 2712.

Specifically, a guiding portion 2721 that is disposed, by using an inside sidewall of the base portion 272, in an inner portion of the base portion 272 guides and holds the operation of the arm portion 712 in a state in which the horizontal movement of the arm portion 712 is restricted.

As shown in FIG. 22, the driving motor 273 includes a screw 2731 and uses the screw 2731 to cause the arm driving portion 2713 of the coupling portion 271 to move in the vertical direction, thereby causing the coupling portion 71 to perform coupling/releasing (decoupling) with respect to the cart 3.

Next, operational states of the coupling portion 271 caused by the driving motor 273 in the coupling device 207 will be described with reference to the drawings.

FIG. 23 is an illustration showing the second state of the coupling device according to the second embodiment. FIG. 24 is an illustration showing a state in which the coupling device in the second state moves to the coupling position with respect to the cart. FIG. 25 is an illustration showing the third state of the coupling device.

The coupling portion 271 performs coupling operation to couple with the cart 3 by changing the state thereof among, roughly, three states.

First, the first state is a state in which the height of the coupling portion 271 is lower than the undersurface of the cart 3 with an automatic towing vehicle 205 entering under the cart 3, as shown in FIG. 22, that is, a state in which the arm portion 712 and the hook portion 711 of the coupling portion 71 are housed in the automatic towing vehicle 205 so as not to protrude from the upper surface 51 of the automatic towing vehicle 205.

Next, as shown in FIG. 23, when the screw 2731 is rotated due to driving of the driving motor 273, the arm driving portion 2713 moves upward, which causes the hook portion 2711 to be disposed above the side frame 35. This state is the second state.

Next, as shown in FIG. 24, when the automatic towing vehicle 205 moves rearward and reaches a predetermined position at which the coupling portion 271 couples with the cart 3, the automatic towing vehicle 205 enters a state of being capable of coupling with the side frame 35 from above the side frame 35.

Then, as shown in FIG. 25, when the driving motor 273 is additionally driven to move the arm portion 2712 downward, the height of the coupling portion 271 becomes higher than the undersurface of the cart 3 and lower than the height in the second state, in other words, when the coupling portion 271 moves to the predetermined position for coupling with the cart 3, the hook portion 2711 of the coupling portion 271 is in a state of coupling with the side frame 35. This state is the third state.

Thus, the driving motor 273 drives and controls the coupling portion 271 so as to be changeable among the first state, the second state, and the third state described above.

In the third embodiment, when the coupling portion 271 changes from the first state, via the second state, to the third state, a portion of the arm portion 2712 is continuously guided in the guiding portion 2721 of the base portion 272, as shown in FIGS. 22 to 25, and is thus held by the guiding portion 2721 in a state in which the horizontal movement of the arm portion 712 is restricted. Consequently, the coupled state of the coupling portion 271 coupling with the side frame 35 is stably maintained.

As a result of the aforementioned configuration, according to the third embodiment, as an alternative to the coupling portion 71 of the first embodiment in which the arm portion 712 performs folding-down operation and vertical operation, the coupling device 207 includes, as a component of the coupling portion 271, the arm portion 2712 that performs coupling operation through only vertical operation in the upright state, which enables operation of coupling/decoupling with respect to the cart 3 to be stably performed with a simple configuration.

Note that the present disclosure is not limited to the aforementioned embodiments and can be variously modified within the scope indicated by the claims. In other words, embodiments obtained by combining together technical features that are modified, as appropriate, within the scope not deviating from the concept of the present disclosure are also included in the technical scope of the present disclosure.

The present disclosure contains subject matter related to that disclosed in Japanese Priority Patent Application JP 2017-167429 filed in the Japan Patent Office on Aug. 31, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A coupling device that couples with a movable vehicle to be towed, comprising:
  a coupling portion that couples with a portion to be coupled to a front portion of the vehicle to be towed;
  a base portion to which an end of the coupling portion is connected; and
  a first driving portion that drives the coupling portion,
  wherein the first driving portion drives the coupling portion so as to be changeable among a first state in which a height of the coupling portion is lower than an undersurface of the vehicle to be towed, a second state in which the height of the coupling portion is higher than the undersurface of the vehicle to be towed, and a third state in which the height of the coupling portion is higher than the undersurface of the vehicle to be towed and lower than the height in the second state, and
  wherein, to couple the coupling portion and the vehicle to be towed to each other, with a portion of the coupling portion and the portion to be coupled facing each other, the first driving portion causes the coupling portion to change from the second state to the third state, thereby causing the coupling portion and the portion to be coupled to enter a coupled state of being coupled to each other,
  wherein the coupling portion includes
    an arm portion that has an end connected to the base portion and that is driven by the first driving portion; and
    a hook portion that is disposed on another end of the arm portion and that couples with the portion to be coupled, and
  wherein, to couple the coupling portion and the vehicle to be towed to each other, the first driving portion drives the arm portion to be lowered from a state in which the hook portion is positioned above the portion to be coupled, thereby causing the coupling portion to enter the coupled state, wherein
  the arm portion enters a state of standing upright from the base portion in the second state and the third state.

2. The coupling device according to claim 1, wherein the arm portion enters a state of being folded down so as to extend in a horizontal direction from the base portion in the first state.

3. The coupling device according to claim 1, wherein the arm portion is positioned lower than the undersurface of the vehicle to be towed in the first state due to the height of the coupling portion being changed in a vertical direction.

4. The coupling device according to claim 1, wherein the first driving portion drives the arm portion to move up and down in a vertical direction.

5. The coupling device according to claim 1, wherein the first driving portion performs a folding/raising operation in which the arm portion changes between the state of standing upright from the base portion and the state of being folded down so as to extend from the base portion in a horizontal direction.

6. The coupling device according to claim 1,
wherein the base portion includes an introducing portion that introduces at least a portion of the coupling portion, and
wherein, in the third state, the coupling portion is held by the base portion in a state in which a portion of the coupling portion to be introduced is introduced into the introducing portion.

7. The coupling device according to claim 6, wherein the coupling portion is held by the base portion in a state in which horizontal movement of the coupling portion is restricted by a sidewall of an inner portion of the introducing portion or by a restricting member disposed in the inner portion of the introducing portion.

8. The coupling device according to claim 1, comprising:
a first position detecting sensor that detects a position of the coupling portion in a vertical direction with respect to the portion to be coupled,
wherein, based on a detection result of the first position detecting sensor, the first driving portion drives the coupling portion so as to change from the second state to the third state.

9. The coupling device according to claim 1, comprising:
a second driving portion capable of adjusting a position of the coupling portion in a horizontal direction with respect to the portion to be coupled.

10. The coupling device according to claim 9, wherein, in the second state, the second driving portion adjusts the position of the coupling portion in the horizontal direction with respect to the portion to be coupled to cause the portion of the coupling portion and the portion to be coupled to face each other.

11. The coupling device according to claim 10, comprising:
a second position detecting sensor that detects a position of the coupling portion in the horizontal direction with respect to the portion to be coupled,
wherein, based on a detection result of the second position detecting sensor, the second driving portion adjusts the position of the coupling portion in the horizontal direction.

12. An automatic towing vehicle comprising the coupling device according to claim 1.

13. The automatic towing vehicle according to claim 12, comprising:
a traveling device for traveling on a traveling surface;
a travel controller that controls traveling; and
a body,
wherein, in the first state, the automatic towing vehicle is capable of entering a gap between the undersurface of the vehicle to be towed and the traveling surface.

14. The automatic towing vehicle according to claim 13, wherein, in the second state, the travel controller controls traveling to cause the portion of the coupling portion and the portion to be coupled to face each other.

15. The automatic towing vehicle according to claim 14, comprising:
a second position detecting sensor that detects a position of the automatic towing vehicle in a horizontal direction with respect to the portion to be coupled,
wherein the travel controller controls traveling based on a position detected by the second position detecting sensor.

16. The automatic towing vehicle according to claim 13,
wherein, in the first state, the automatic towing vehicle enters an underlying state in which at least a portion of the body enters the gap between the undersurface of the vehicle to be towed and the traveling surface,
wherein, in the underlying state, the first state changes to the second state with the coupling portion being positioned outside a region directly under the undersurface of the vehicle to be towed,
wherein, in the second state, the position of the automatic towing vehicle in a horizontal direction is adjusted to cause the portion of the coupling portion and the portion to be coupled to face each other, and
wherein, with the portion of the coupling portion and the portion to be coupled facing each other, the second state changes to the third state, thereby causing the coupling portion and the portion to be coupled to enter a coupled state of being coupled to each other.

17. An automatic towing system comprising:
the automatic towing vehicle according to claim 12; and
a vehicle to be towed by the automatic towing vehicle.

* * * * *